United States Patent [19]

Umebayashi et al.

[11] Patent Number: 5,430,594
[45] Date of Patent: Jul. 4, 1995

[54] MAGNETIC RECORDING MEDIUM

[75] Inventors: Nobuhiro Umebayashi, Tsukuba; Minoru Fujita, Toride, both of Japan

[73] Assignee: Hitachi Maxell, Ltd., Osaka, Japan

[21] Appl. No.: 240,370

[22] Filed: May 10, 1994

[30] Foreign Application Priority Data

May 10, 1993 [JP] Japan .................. 5-108283

[51] Int. Cl.⁶ ............................................. G11B 21/10
[52] U.S. Cl. ................................... 360/131; 360/135
[58] Field of Search ............... 360/131, 133, 135

[56] References Cited

U.S. PATENT DOCUMENTS

| | | | |
|---|---|---|---|
| 4,935,835 | 6/1990 | Godwin et al. | 360/135 |
| 5,138,511 | 8/1992 | Hoshimi et al. | 360/135 |
| 5,199,022 | 3/1993 | Suzuki et al. | 369/275.1 |
| 5,208,706 | 5/1993 | Lemelson | 360/2 |
| 5,296,995 | 3/1994 | Yonezawa et al. | 360/135 |
| 5,313,357 | 5/1994 | Ohta et al. | 360/134 |
| 5,355,270 | 10/1994 | Umebayashi et al. | 360/135 |

FOREIGN PATENT DOCUMENTS 2-187969  7/1990  Japan .

Primary Examiner—John H. Wolff
Attorney, Agent, or Firm—Birch, Stewart, Kolasch & Birch

[57] ABSTRACT

There is provided a magnetic recording medium which is highly reliable so that tracking servo can be properly effected wherein $Z \leq 0.49$ is established when light reflectance on a data track is represented by X, light reflectance of a magnetic head-tracking recess is represented by Y, and $Z = Y/X$.

25 Claims, 12 Drawing Sheets

MAGNETIC RECORDING MEDIUM

BACKGROUND OF THE INVENTION

1. Field of the Invention

This invention relates generally to a magnetic recording medium, for example, a flexible magnetic disk, and more particularly to a magnetic recording medium having magnetic head-tracking optical recesses for optically effecting the tracking of a magnetic head.

2. Description of Related Art

Recently, personal computers and word processors have been extensively used, and in this connection external storage (memory) units for use with them have been required to have a more compact size and a larger capacity. To meet these requirements, there has been proposed a flexible magnetic disk (as disclosed in Japanese Patent Unexamined Publication No. 2-187969) in which a reference track is formed at an innermost peripheral portion of a doughnut-like recording region of the disk, and a number of magnetic head-tracking optical recesses of a ring-shape are formed radially outwardly of the reference track at predetermined intervals in concentric relation to the reference track, and the region between any two adjacent ring-shaped magnetic head-tracking recesses serves as a data track.

FIGS. 22 and 23 are enlarged cross-sectional and a plan views, respectively, which explain this kind of magnetic disk.

As shown in these Figures, a magnetic layer 101 is formed on a surface of a base film 100, and grooves 102 for tracking servo are formed by laser beam machining or the like to extend in the direction of rotation of the magnetic disk. The region between any two adjacent grooves 102 and 102 serves as a data track 103 (see FIG. 23).

On the other hand, a magnetic recording/reproducing device is provided with a light-emitting element (not shown) for emitting a light beam 104 for tracking servo onto the surface of the magnetic disk, and light-receiving elements 106a, 106b, 106c and 106d (see FIG. 23) for receiving reflection light 105 from the surface of the magnetic disk.

The light beam 104 emitted from the light-emitting element impinges on the surface of the magnetic disk, and the reflection light 105 from this surface is received by the light-emitting elements 106a, 106b, 106c and 106d.

Since the tracking servo grooves 102 are formed in the magnetic layer 101 as described above, the intensity of light reflected on the data track 13 differs from the intensity of light reflected on the groove 12. In the example shown in FIG. 23, a total output value of the light-receiving elements 106a and 106b is always compared with a total output value of the light-receiving elements 106c and 106d, and the tracking servo of a magnetic head (not shown) is carried out in such a manner that the two output values become equal to each other.

The magnetic layer 101 of the conventional magnetic disk has a thickness of 1~3 $\mu$m, and therefore the light-receiving elements 106a, 106b, 106c and 106d could satisfactorily receive the reflection light 105 from the surface of the magnetic disk.

However, if the thickness of the magnetic layer is reduced to less than 1 $\mu$m in order to improve overwrite characteristics of the magnetic disk, the intensity of reflection on the data track is liable to vary, which has resulted in a problem that it is difficult to effect a proper tracking servo.

SUMMARY OF THE INVENTION

It is an object of the present invention to overcome the above problems of the prior art, and more specifically to provide a magnetic recording medium which is highly reliable so that a proper tracking servo can be effected.

In order to achieve the above object, the present invention is directed to a magnetic recording medium comprising a substrate of a non-magnetic material, and a magnetic layer formed on the substrate wherein a number of magnetic head-tracking recesses are formed in a surface of the magnetic layer at predetermined intervals;

a data track for recording desired information is formed between any two adjacent magnetic head-tracking recesses; and light is applied to the magnetic head-tracking recesses and the data tracks, so that the tracking of a magnetic head is effected in accordance with the light reflected by the tracking recesses and the data tracks, and a feature $Z \leq 0.49$ is established when light reflectance on the data track is represented by X, light reflectance of the magnetic head-tracking recess is represented by Y, and $Z = Y/X$.

In the present invention, the light reflectance on the data track, as well as the ratio of this light reflectance to the light reflectance of the magnetic head-tracking recess, is limited as described above. By so doing, the tracking servo of the magnetic head by the tracking recesses can be properly effected, so that the reliability of the operation of the magnetic recording medium can be enhanced.

DETAILED DESCRIPTION OF THE INVENTION

Figure 1:
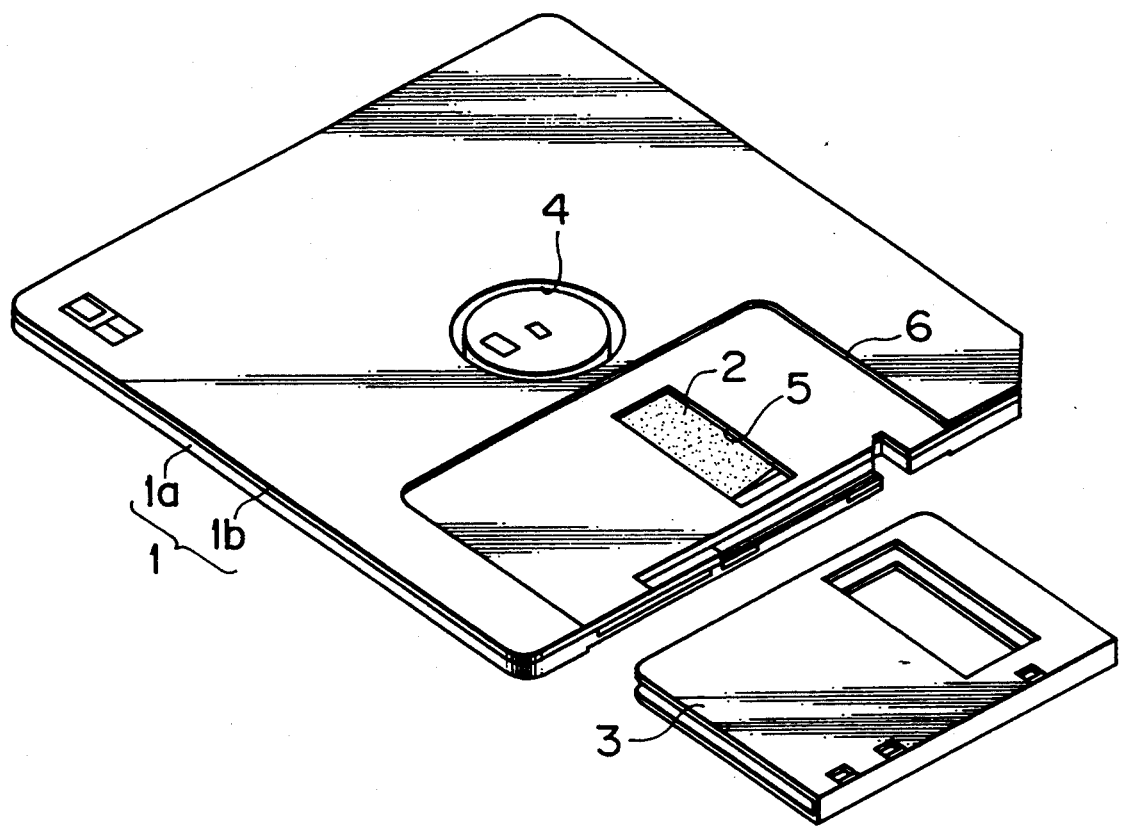
FIG. 1 is a partly-exploded perspective view of a magnetic disk cartridge according to an embodiment of the present invention.
Figure 2:
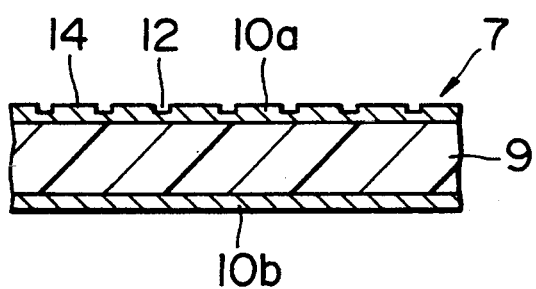
FIG. 2 is an enlarged cross-sectional view of a magnetic sheet.
Figure 3:
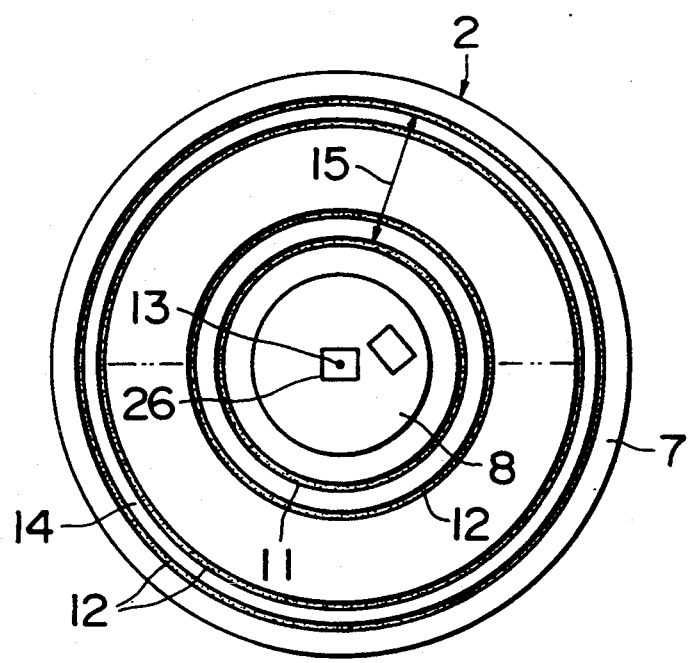
FIG. 3 is a plan view of the magnetic disk.

A preferred embodiment of the present invention will now be described with reference to the drawings. FIG. 1 is a partly-exploded, perspective view of one embodiment of a magnetic disk cartridge of the present invention, FIG. 2 is an enlarged cross-sectional view of a magnetic sheet, and FIG. 3 is a plan view of a magnetic disk. As shown in FIG. 1, the magnetic disk cartridge mainly comprises a cartridge case 1, a flexible magnetic disk 2 rotatably housed in the cartridge case 1, a shutter 3 slidably mounted on the cartridge case 1, an a cleaning sheet (not shown) fused to the inner surface of the cartridge case 1. The cartridge case 1 is composed of an upper case 1a and a lower case 1b, and these cases are injection molded, for example, of a rigid synthetic resin, such as an ABS resin.

A rotation drive shaft-insertion hole 4 is formed through a generally central portion of the lower case 1b, and a head insertion hole 5 of a rectangular shape is formed adjacent to this insertion hole 4. Although not shown in the drawings, another head insertion hole 5 is similarly formed through the upper case 1a. Each of the upper and lower cases 1a and 1b is slightly recessed adjacent to its front side to provide a depression 6 for limiting the range of sliding movement of the shutter 3. The head insertion hole 5 is open at a generally central portion of this depression 6.

As shown in FIG. 3, the magnetic disk 2 comprises a doughnut-like flexible magnetic sheet 7, and a center hub 8 of metal or a synthetic resin inserted in and bonded to a center hole of the magnetic sheet 7. The magnetic sheet 7 comprises a base film 9, and magnetic layers 10a and 10b formed or coated respectively on the opposite sides or faces of the base film 9.

The base film 9 is composed, for example, of a film of a synthetic resin such as polyethylene terephthalate (PET), polyethylene naphthalate (PEN) and a polyimide. Each of the magnetic layers 10a and 10b is composed of a mixture of ferromagnetic powder, a binder, abrasive powder, and a lubricant. As the ferromagnetic powder, for example, there is used fine powder of barium ferrite, strontium ferrite, $\alpha$-Fe, Co—Ni, Co—P, $\gamma$-Fe$_2$O$_3$, Fe$_3$O$_4$, Co-containing $\gamma$-Fe$_2$O$_3$, Co-containing $\gamma$-Fe$_3$O$_4$, CrO$_2$, Co, Fe—Ni or the like.

As the binder, for example, there is used a vinyl chloride-vinyl acetate copolymer, a vinyl chloride-vinyl acetate-vinyl alcohol copolymer, a urethane resin, a polyisocyanate compound, a radiation-curing resin or the like.

As the abrasive powder, for example, there is used aluminum oxide, chromium oxide, silicon carbide, silicon nitride or the like. Preferably, the percentage of addition of the abrasive powder is about 0.1 wt % to about 25 wt. % relative to the magnetic powder.

As the lubricant, for example, there can be used higher fatty acid such as stearic acid and oleic acid, higher fatty ester such as oleyl oleate and glycerin oleate, liquid paraffin, squalane, a fluoroplastics, fluorine oil, silicon oil or the like.

Specific examples of the magnetic coating composition are given as follows:

Example 1 of Magnetic Coating Composition

| | |
|---|---|
| Barium ferrite (Hc: 530[Oe], Magnitude of saturation magnetization: 57[emu/g], plate diameter: 0.05[μm]) | 100 parts by weight |
| Vinyl chloride-vinyl acetate-vinyl alcohol copolymer | 11.0 parts by weight |
| Urethane resin | 6.6 parts by weight |
| Trifunctional isocyanate compound | 4.4 parts by weight |
| Aluminum oxide powder (Average particle size: 0.43[μm]) | 15 parts by weight |
| Carbon black (Average particle size: 0.3[μm]) | 2 parts by weight |
| Carbon black (Average particle size: 0.02[μm]) | 2 parts by weight |
| Oleyl oleate | 6 parts by weight |
| Cyclohexane | 150 parts by weight |
| Toluene | 150 parts by weight |

Example 2 of Magnetic Coating Composition

| | |
|---|---|
| $\alpha$-Fe (Hc: 1650[Oe], Magnitude of saturation magnetization: 135[emu/g], Average size of major axis: 0.25[μm], Average axis (aspect) ratio: 8) | 100 parts by weight |
| Vinyl chloride-vinyl acetate-vinyl alcohol copolymer | 14.1 parts by weight |
| Urethane resin | 8.5 parts by weight |
| Trifunctional isocyanate compound | 5.6 parts by weight |
| Aluminum oxide powder (Average particle size: 0.43[μm]) | 20 parts by weight |
| Carbon black (Average particle size: 0.3[μm]) | 2 parts by weight |
| Carbon black (Average particle size: 0.02[μm]) | 2 parts by weight |
| Oleyl oleate | 6 parts by weight |
| Cyclohexane | 150 parts by weight |
| Toluene | 150 parts by weight |

The components of the above Examples 1 or 2 of the magnetic coating composition are sufficiently mixed and dispersed in a ball mill to prepare the magnetic coating material, and this coating material is coated onto both sides of a base film of polyethylene terephthalate (PET), having a thickness of 62 μm, in such an amount that each coated layer, when dried, can have an average thickness of 0.79 μm. The coated layers are dried, and then are processed by calendering to form the magnetic layers 10a and 10b, respectively.

A reference track 11 and a number of magnetic head-tracking optical tracks 12 are formed on the surface of the magnetic layer 10a of the thus formed magnetic disk 2 by embossing or the like, as shown in FIG. 3. The reference track 11 and the magnetic head-tracking optical tracks 12 are concentrically arranged about the center or axis 13 of rotation of the magnetic disk 2. A data track 14 capable of recording desired information is formed between one magnetic head-tracking optical track 12 and its adjoining magnetic head-tracking optical track 12.

As shown in FIG. 3, the reference track 11 is formed at an innermost peripheral portion of a recording region 15 provided on the magnetic disk 2, and a number of magnetic head-tracking optical tracks 12 and a number of data tracks 14 are alternately formed radially outwardly of the reference track 11, that is, radially outwardly in a direction perpendicular to the direction of travel of a magnetic head.

Figure 4:
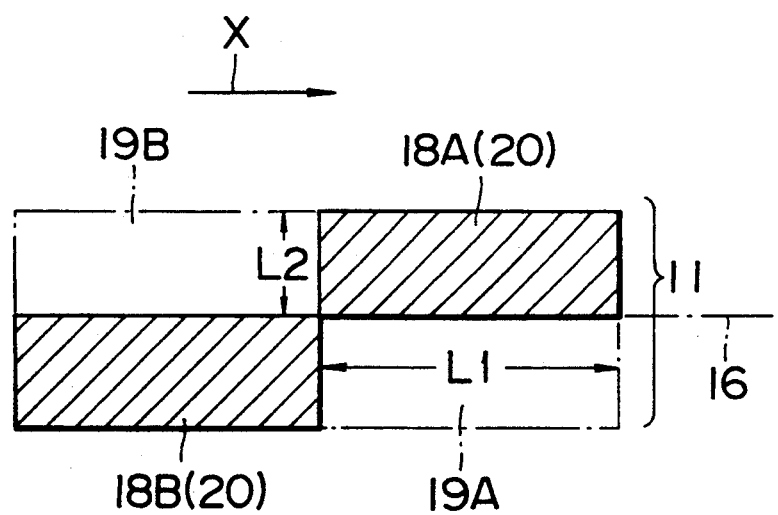
FIG. 4 is an enlarged plan view of a portion of a reference track.

As shown in FIG. 4, the reference track 11 extends along the direction X of travel of the magnetic head, and a pair of rectangular reference recess regions 18A and 18B are formed symmetrically with respect to an arbitrary point 17 on a centerline 16 of the reference track 11. A flat portion 19A with no recess is provided adjacent to the reference recess region 18A (that is, forwardly of the reference recess region 18B), and also a flat portion 19B with no recess is provided adjacent to the reference recess region 18B (that is, rearwardly of the reference recess region 18A).

A number of sets of reference recess regions 18A and 18b and the flat portions 19A and 19B are formed at intervals or continuously along the direction X of travel of the magnetic head to thereby form the reference track 11. In this embodiment, a length L1 of each of the reference recess regions 18A and 18B in the direction of travel of the magnetic head is 2.4 mm, and a length L2 in its widthwise direction is 18 μm.

A predetermined signal is beforehand recorded magnetically on the reference track 11, and the magnetic head scans this reference track 11, and in accordance with a signal waveform obtained by this scanning, the center position (a magnetic gap) of the magnetic head can be brought to the centerline 16 of the reference track 11.

The magnetic head (the magnetic gap) is thus brought into registry with the centerline 16 of the reference track 11 (that is, a reference position), and at the same time by the use of a photodetector (later described) comprising a light-emitting element and a group of light-receiving elements connected to the magnetic head, the position of the photodetector between the magnetic head-tracking optical tracks 12 is detected. Then, the amount of positional deviation of the photodetector relative to these optical tracks 12 is calculated, and the tracking servo of the magnetic head is effected in accordance with this deviation amount in a manner described below.

Thereafter, a motor for transferring a magnetic head carriage is rotated to bring the center position of the magnetic head to a position near to a centerline 24 of the data track (see FIG. 5) disposed at the innermost peripheral portion. Then, the tracking servo of the magnetic head is carried out for each track, utilizing the magnetic head-tracking optical tracks 12.

Figure 5:
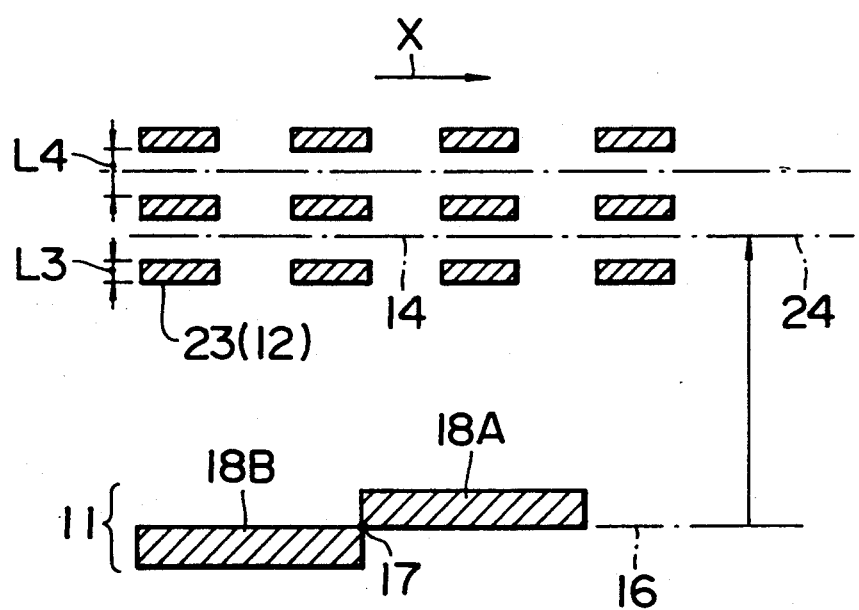
FIG. 5 is a view explanatory of the reference track and magnetic head-tracking optical tracks.
Figure 6:
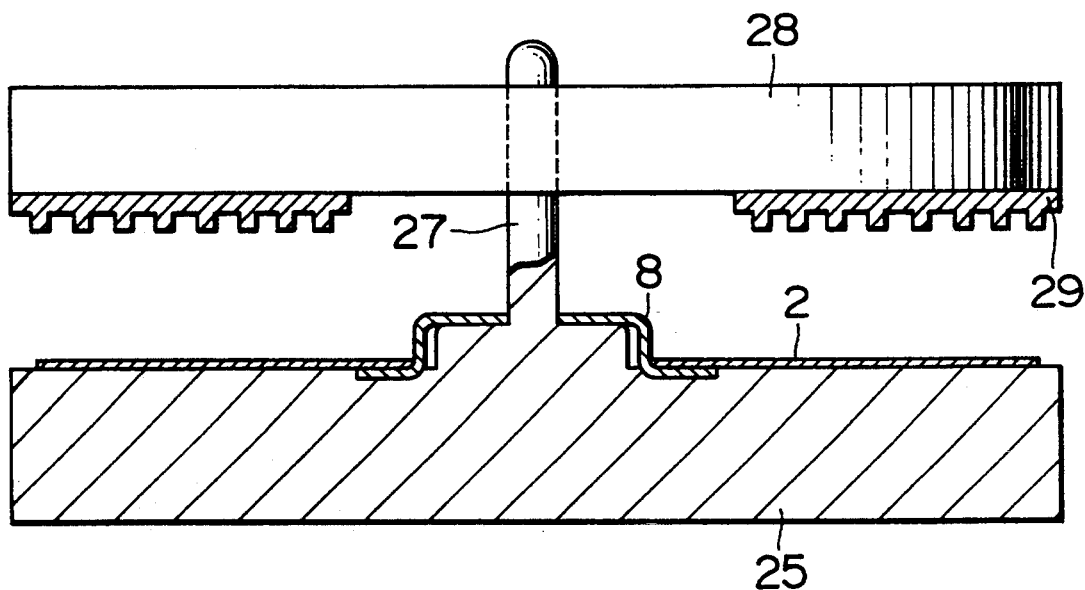
FIG. 6 is a cross-sectional view showing a machine for forming the reference track and the magnetic head-tracking optical tracks.

FIGS. 5 to 9 are views for explaining the tracking servo of the magnetic disk. As shown in FIG. 5, also, tracking recesses 23 are formed at intervals or continuously in the magnetic head-tracking optical track 12 along the direction X of travel of the magnetic head. In this embodiment, the tracking recess 23 is formed at intervals, and the width L3 of the tracking recess 23 is 5 μm, and the width L4 of the data track 14 is 15 μm. The reference recess regions 18A and 18B and the tracking recesses 23 are simultaneously formed by pressing, as shown in FIG. 6.

As shown in FIG. 6, the magnetic disk 2 having the center hub 8 mounted thereon is set on a base 25. In an earlier step, this magnetic disk has been subjected to polishing, so that the magnetic layers 10a and 10b have a predetermined surface roughness. Projected from the base 25 is a center pin 27 for being inserted into a center hole 26 (see FIG. 3) of the center hub 8. The center pin 27 is passed through the center hole 26 of the center hub 8, thereby positioning the magnetic disk 2 on the base 25.

A stamper 28 is mounted above the base 25 in parallel relation thereto so as to move upward and downward, and the upward and downward movement of the stamper 28 is guided by the center pin 27. A number of fine projections 29 for forming the reference recess regions 18A and 18B and the tracking recesses 23 are formed on a lower surface of the stamper 28. The stamper 28 is lowered from the position shown in FIG. 6, so that the magnetic disk 2 is held between the base 25 and the stamper 28 under a predetermined pressure. By doing so, the projections 29 formed on the stamper 28 bite the surface of the magnetic layer 10a, so that the reference recess regions 18A and 18B and the tracking recesses 23, having a generally trapezoidal cross-section, are formed by compression.

Figure 7:
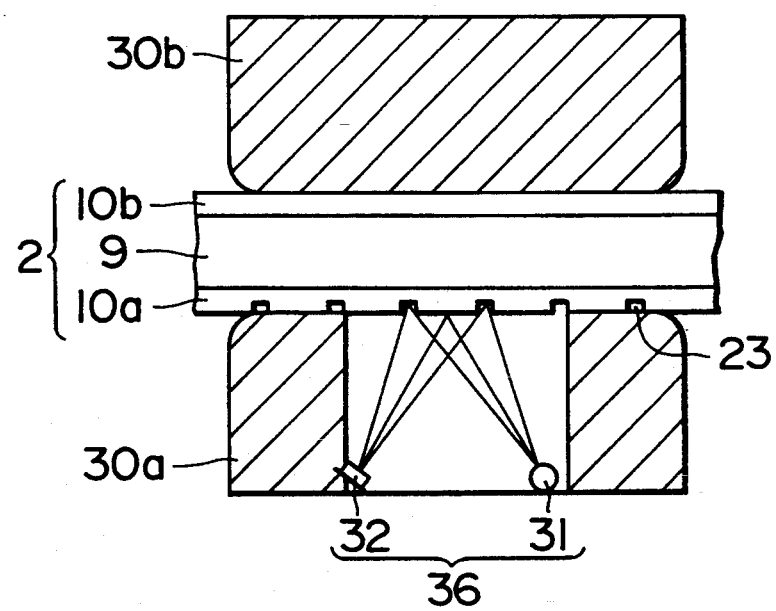
FIG. 7 is a cross-sectional view explanatory of the tracking servo of a magnetic head.
Figure 8:
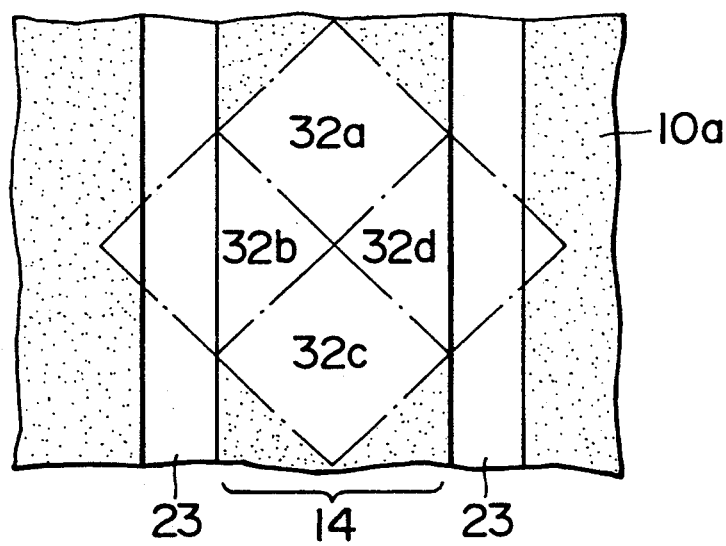
FIG. 8 is a view explanatory of the condition of arrangement of light-receiving elements.
Figure 9:
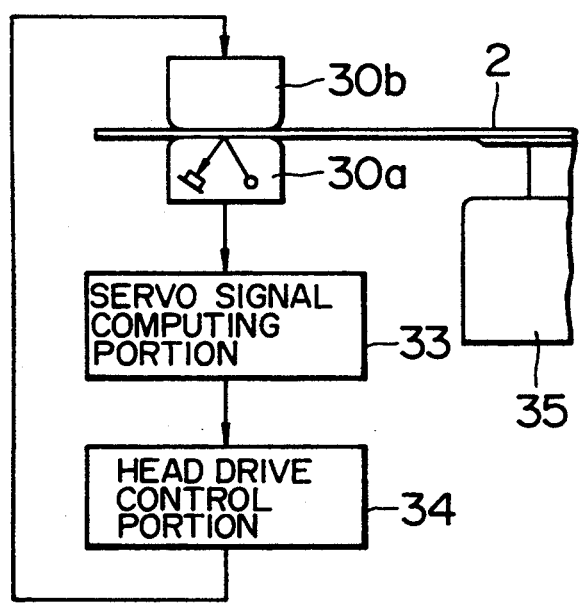
FIG. 9 is a cross-sectional view explanatory of a tracking control of the magnetic head.

At the time of the recording and reproduction, the magnetic disk 2 is rotated while held between magnetic heads 30a and 30b, as shown in FIG. 7. A light-emitting element 31 (e.g. LED) for outputting a light beam for the tracking servo, as well as a group of light-receiving elements 32 for receiving reflected light from the magnetic layer 10a, is mounted integrally on the magnetic head 30a. That portion of the magnetic head 30a where the light-emitting element 31 and the light-receiving elements 32 are mounted is open toward the magnetic disk 2. The light-receiving element group 32 consists of four light-receiving elements 32a, 32b, 32c and 32d, as shown in FIG. 8. The light, reflected by the data track 14 and the tracking optical recesses 23, are received by these light-receiving elements 32a, 32b, 32c and 32d, and the output of each of the light-receiving elements 32a, 32b, 32c and 32d is inputted to a servo signal computing portion 33, as shown in FIG. 9. A position correction signal obtained at this servo signal computing portion 33 is inputted to a head drive control portion 34, and the tracking control of the magnetic head 30 is effected in accordance with a control signal from the head drive control portion 34.

As shown in FIG. 8, the four light-receiving elements 32a, 32b, 32c and 32d are disposed in close proximity to one another, and the light-receiving element 32a is disposed in opposed relation to the light-receiving element 32c whereas the light-receiving element 32b is disposed in opposed relation to the light-receiving element 32d. The light-receiving elements 32a and 32c serve mainly to scan the data track 14, and the light-receiving element 32b serves mainly to scan the tracking recess 23 disposed on one side of this data track 14 whereas the light-receiving element 32d serves mainly to scan the tracking recess 23 disposed on the other side of this data track 14.

Assuming that the output from the light-receiving element 32a, the output from the light-receiving element 32b, the output from the light-receiving element 32c and the output from the light-receiving element 32d are represented by $P_1$, $P_2$, $P_3$ and $P_4$, respectively, $P_2-P_3=N$, $P_1-P_4=Q$ and $(N+Q)/2$ are calculated, so that the output $(N+Q)/2$ (V) is obtained as the servo signal.

Changing the light reflectance on the data track 14, as well as the light reflectance on the tracking recesses 23, in various ways, the relation between the magnitude of the output $(N+Q)/2$ and the amount of overwrite (O.W) due to off-track has been extensively studied, and results thereof are shown collectively in Table 1 below. The overwrite (O.W) amount due to the off-track represents the ratio of a residual If signal to a 2f signal obtained when the signal (If signal) of 150 KHz is first written without effecting side erasure, and then the signal (2F signal) of 600 KHz is overwritten thereon.

TABLE 1

| Output (N + Q)/2 (V) | Overwrite amount (dB) |
|---|---|
| 3.0 | −23 |
| 3.5 | −27 |
| 3.7 | −29 |
| 4.0 | −30 |
| 5.6 | −33 |
| 6.0 | −33 |

As is clear from this Table, if the output $(N+Q)/2$ is less than 3.7 (V), it is insufficient as an signal output, and the tracking control of the magnetic head is not carried out positively, and the overwrite amount due to the off-track is large. On the other hand, if the output $(N+Q)/2$ is not less than 3.7 (V), the servo signal of a large output is obtained, and therefore the tracking control of the magnetic head is carried out positively, and the overwrite amount due to the off-track is small, and the reliability of the operation is excellent. Particularly, if the output $(N+Q)/2$ is not less than 4.0 (V), and more preferably not less than 5.6 (V), the servo signal of a sufficient magnitude can be obtained.

As described above, the output $(N+Q)/2$ is influenced by the performance of the light-emitting element 31 and the light-receiving elements 32a to 32d and other factor, and therefore it has become clear from results of various tests conducted by the inventors of the present invention that in order to obtain the output $(N+Q)/2$ of not less than 3.7 (V), the value of Z should be limited to not more than 0.49 when X represents the light reflectance on the data track 14, Y represents the light reflectance on the head-tracking recess 23, and $Z=Y/Z$ is established.

Figure 10A:
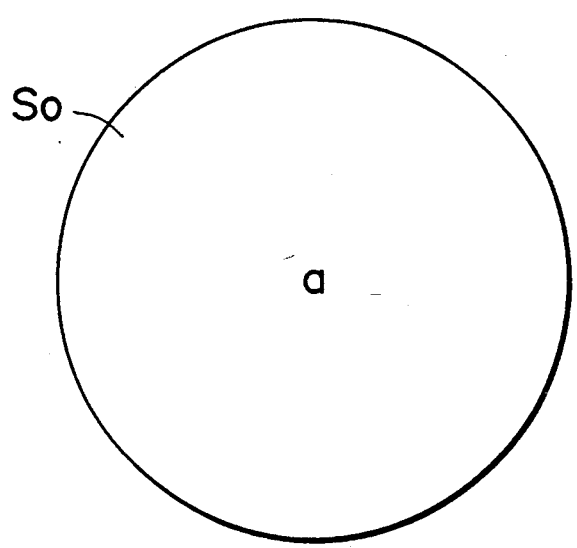
FIG. 10A is a view explanatory of a total area of a spot of irradiated light.

As shown in FIG. 10A, assuming that the amount of reflection of light per unit area where the tracking recesses 23 are not formed is represented by a, and that the area of a spot of light on the surface of the magnetic layer which light is applied from the light-emitting element 31 is represented by $S_0$, a total reflection light amount A is expressed by the following formula:

$$A = a \cdot S_0 \quad (1)$$

Figure 10B:
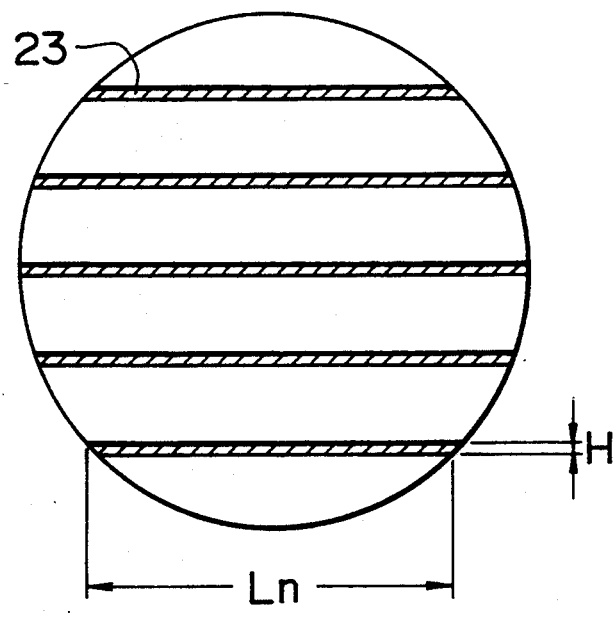
FIG. 10B is a view explanatory of the ratio of a total area of the tracking recesses within the light spot.

Also, as shown in FIG. 10B, assuming that the amount of reflection of light per unit area of the tracking recess 23 is represented by b, and that a total area of the tracking recesses 23 is represented by $S_1$, a total reflection light amount B of the tracking recesses 23 is expressed by the following formula:

$$B = b \cdot S_1 \quad (2)$$

From the above formulas (1) and (2), a total reflection light amount C of the light spot $S_0$, after the tracking recesses 23 are formed, is expressed by the following formula:

$$\begin{aligned} C &= (S_0 - S_1) \cdot a + b \cdot S_1 \\ &= a \cdot S_0 - a \cdot S_1 + b \cdot S_1 \\ &= A - a \cdot S_1 + B \end{aligned} \quad (3)$$

Therefore, the total reflection light amount B of the tracking recesses 23 is expressed by the following formula:

$$B = C - A + a \cdot S_1 \quad (4)$$

From $A = a \cdot S_0$, the following is obtained:

$$B = C - A + (S_1/S_0) \cdot A \quad (5)$$

Figure 11:
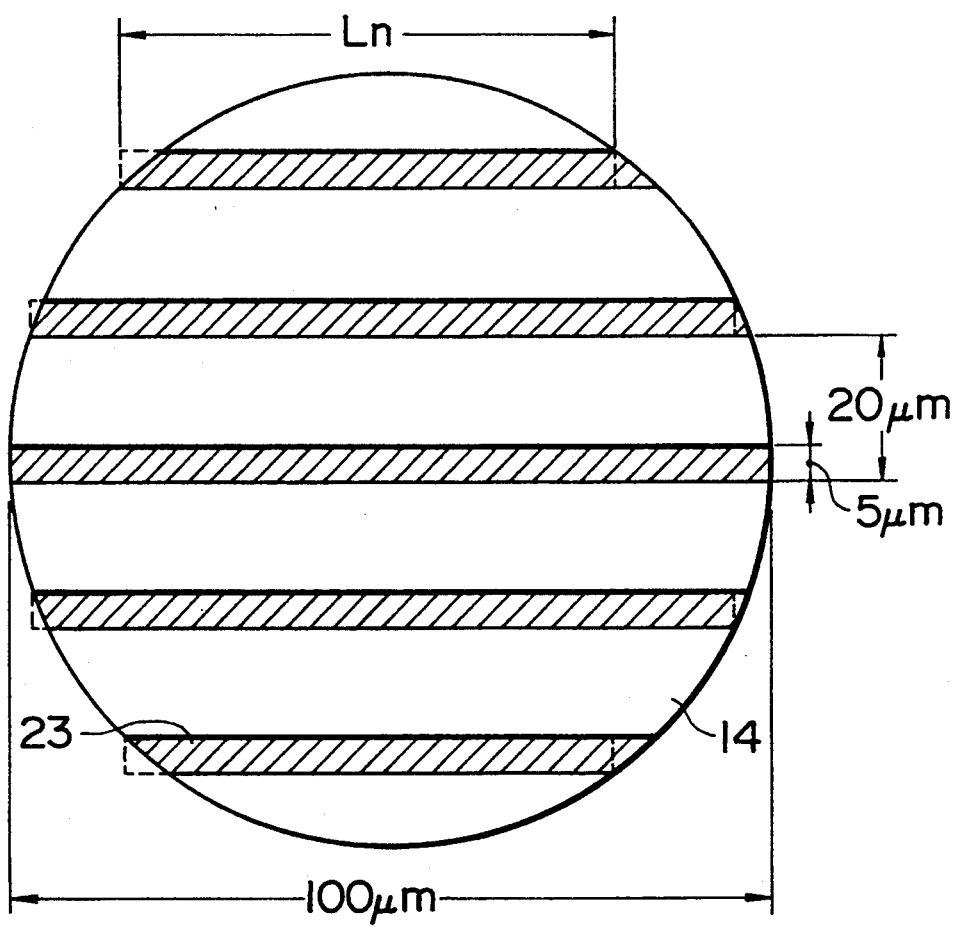
FIG. 11 is a view showing dimensions of the light spot, data tracks and the tracking recesses.

As shown in FIG. 11, assuming that the diameter of the light spot is 100 μm, $S_0$ is expressed by the following formula:

$$\begin{aligned} S_0 &= \pi \cdot (d/2)^2 \\ &= \pi \cdot (100/2)^2 \\ &= 7853.98 \ [\mu m^2] \end{aligned}$$

Assuming that the width (H) of the tracking recess 23 is 5 μm, the pitch of the data tracks 14 is 20 μm, and a duty ratio in a direction of the circumference of the servo groove is 50%, $S_1$ is expressed by the following formula:

$$\begin{aligned} S_1 &= H(L_1 + L_2 + L_3 + L_4 + L_5) \times 0.5 \\ &= 5(66 + 94 + 99.5 + 89 + 61) \times 0.5 \\ &= 1023.75 \ [\mu m^2] \end{aligned}$$

Therefore, the following is obtained:

$$\begin{aligned} S_1/S_0 &= 1023.75/7853.98 \\ &= 0.13 \end{aligned}$$

In the case of the servo signal output $(N+Q)/2=3.7$, when the light reflectance A of the flat portion of the magnetic layer surface, where no tracking recess 23 was formed, as well as the light reflectance C after the tracking recesses 23 were formed, was measured, and results are shown in the following:

A=11.9%

C=11.1%

Therefore, $$Z = Y/X$$
$$= \{C + (S_1/S_0 - 1) \cdot A\}/A \cdot (S_0/S_1)$$
$$= 0.483$$

Therefore, the tracking recesses 23 should be formed in the flat portion in such a manner that $Z \leq 0.49$ is satisfied.

With respect to specific means for making the ratio of the light reflectance on the data tracks 14 to the light reflectance on the tracking recesses 23 not more than 49%, the light reflectance on the data tracks 14 is increased, or (and) the light reflectance on the tracking recesses 23 is decreased. Examples of the former specific means for increasing the light reflectance on the data tracks 14 include the following means, and these can be suitably used either alone or in combination:

(1) The thickness of the magnetic layer is limited to a specified range so that a high reflectance can be obtained;
(2) The surface roughness of the magnetic layer is limited; and
(3) A reflecting film is formed beneath those portions of the magnetic layer in which the data tracks are to be formed.

The inventors of the present invention have conducted various kinds of tests with respect to the relation between the thickness of the magnetic layer 10 and the reflectance on the data tracks 14, as well as the overwrite characteristics.

Light emitted from the light-emitting element 31 (comprising an infrared light-emitting diode) had a central wavelength of 880 nm, and the incident angle of this light was 20 degrees, and in this case the light reflectance on the data tracks 14 and the overwrite characteristics were measured, and results thereof are collectively shown in Table 2 below.

The thickness of the magnetic layer 10 was measured using a transmission-type electron microscope (TEM), H-700H, manufactured by HITACHI SEISAKUSHO K.K. In tests described below, the thickness of the magnetic layer 10 was measured using the same device.

TABLE 2

| Thickness of magnetic layer (μm) | Reflectance (%) | Overwrite characteristics (dB) |
| --- | --- | --- |
| 0.21 | 6.2 | −42.2 |
| 0.28 | 10.5 | −40.5 |
| 0.31 | 11.0 | −40.3 |
| 0.33 | 11.3 | −40.0 |
| 0.38 | 11.0 | −39.5 |
| 0.39 | 10.0 | −39.0 |
| 0.44 | 6.4 | −38.0 |
| 0.48 | 10.2 | −36.2 |
| 0.52 | 11.0 | −36.0 |
| 0.55 | 11.3 | −35.7 |
| 0.59 | 11.0 | −33.5 |
| 0.60 | 10.5 | −33.3 |
| 0.62 | 8.1 | −33.0 |
| 0.66 | 6.5 | −32.8 |
| 0.72 | 10.8 | −32.6 |
| 0.76 | 11.0 | −31.2 |
| 0.79 | 11.2 | −30.3 |
| 0.84 | 11.0 | −30.0 |
| 0.86 | 10.4 | −29.8 |
| 1.02 | 10.8 | −26.5 |
| 1.24 | 11.2 | −25.2 |
| 1.47 | 10.7 | −23.1 |

As is clear from this Table 2, when the thickness of the magnetic layer 10 is more than 1.15 μm, the overwrite characteristics are more than −26 dB, and hence are poor. Therefore, it is necessary that the thickness of the magnetic layer 10 should be limited to not more than 0.86 μm. With respect to the limit of not more than 0.86 μm, if this thickness is limited to any one of the range of 0.28 to 0.39 μm, the range of 0.48 to 0.59 μm and the range of 0.72 to 0.86 μm, a high reflectance (not less than 10%) and good overwrite characteristics (not more than −30 dB) can be obtained. Particularly, if the thickness of the magnetic layer 10 is limited to any one of the range of 0.31 to 0.38 μm, the range of 0.52 to 0.59 μm and the range of 0.76 to 0.84 μm, a higher reflectance and better overwrite characteristics can be obtained.

Light emitted from the light-emitting element 31 (comprising an infrared light-emitting diode) had a central wavelength of 830 nm, and the incident angle of this light was 40 degrees, and in this case the light reflectance on the data tracks 14 was measured while varying the thickness of the magnetic layer 10 in various ways, and results thereof are collectively shown in Table 3 below.

TABLE 3

| Thickness of magnetic layer (μm) | Reflectance (%) |
| --- | --- |
| 0.21 | 6.1 |
| 0.28 | 10.7 |
| 0.31 | 11.0 |
| 0.33 | 11.5 |
| 0.38 | 11.0 |
| 0.40 | 10.3 |
| 0.44 | 6.2 |
| 0.49 | 10.3 |
| 0.52 | 11.1 |
| 0.55 | 11.3 |
| 0.59 | 11.0 |
| 0.60 | 10.5 |
| 0.62 | 7.5 |
| 0.66 | 6.0 |
| 0.72 | 10.6 |
| 0.76 | 11.1 |
| 0.79 | 11.2 |
| 0.84 | 11.0 |
| 0.86 | 10.2 |
| 1.02 | 10.5 |
| 1.24 | 11.5 |
| 1.47 | 10.3 |

Light emitted from the light-emitting element 31 (comprising a semiconductor laser) had a central wavelength of 780 nm, and the incident angle of this light was 60 degrees, and in this case the light reflectance on the data tracks 14 was measured while varying the thickness of the magnetic layer 10 in various ways, and results thereof are collectively shown in Table 4 below.

TABLE 4

| Thickness of magnetic layer (μm) | Reflectance (%) |
| --- | --- |
| 0.21 | 6.5 |
| 0.28 | 10.3 |
| 0.31 | 11.5 |
| 0.33 | 11.3 |
| 0.38 | 11.1 |
| 0.40 | 10.2 |
| 0.44 | 6.0 |
| 0.49 | 10.2 |
| 0.52 | 11.0 |
| 0.55 | 11.5 |
| 0.59 | 11.1 |
| 0.60 | 10.5 |
| 0.62 | 7.8 |
| 0.66 | 6.6 |
| 0.72 | 10.7 |
| 0.76 | 11.0 |
| 0.79 | 11.2 |

TABLE 4-continued

| Thickness of magnetic layer (μm) | Reflectance (%) |
|---|---|
| 0.84 | 10.9 |
| 0.86 | 10.4 |
| 1.02 | 10.5 |
| 1.24 | 11.0 |
| 1.47 | 10.6 |

As is also clear from the results of Tables 3 and 4, if the thickness of the magnetic coating 10 is limited to any one of the range of 0.28 to 0.40 μm, the range of 0.49 to 0.60 μm and the range of 0.72 to 0.86 μm, a high reflectance (not less than 10%) can be obtained. Particularly, if the thickness of the magnetic layer 10 is limited to any one of the range of 0.31 to 0.38 μm, the range of 0.52 to 0.59 μm and the range of 0.76 to 0.84 μm, a higher reflectance can be obtained.

Barium ferrite with an average particle size of 0.04 μm was used as magnetic powder by which the magnetic layer 10 was formed into a uniform thickness of 0.79 μm, and an infrared light-emitting diode for emitting light having an average wavelength of 880 nm was used as the light-emitting element 31, and the incident angle of the light from the light-emitting element 31 was 20 degrees. In this case, the relation between a surface roughness (Ra) of the magnetic layer 10 and variations of light reflectance was studied, and results thereof are shown in Table 5 below.

TABLE 5

| Surface roughness (Ra) of magnetic layer | Range of variations of light reflectance (%) |
|---|---|
| 0.020 | 7.0~9.5 |
| 0.015 | 10.5~11.3 |
| 0.006 | 11.2~12.2 |

As is clear from this Table, if the surface roughness (Ra) of the magnetic layer is not more than 0.015 μm, the range of variations of the light reflectance is narrow, and the quality is constant.

Incidentally, the surface roughness (Ra) of the magnetic layer can be adjusted to a desired value, for example, by controlling processing conditions of a calendering step during the manufacture of the magnetic recording medium.

Figure 12:
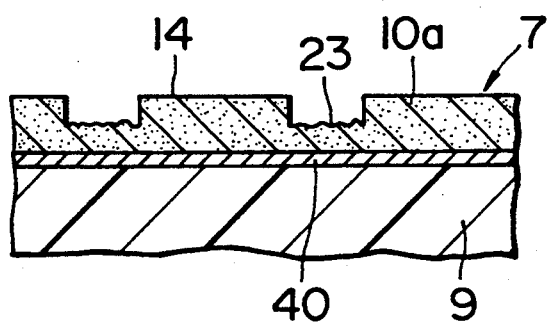
FIG. 12 is an enlarged cross-sectional view of a magnetic recording medium according to another embodiment of the present invention.

FIG. 12 is an enlarged, cross-sectional view showing another embodiment of the present invention. In this embodiment, a light reflecting film 40, comprising, as a main component, metal such as aluminum, tin, nickel and copper, or a metal oxide such as titanium oxide, is formed on a base film 9, and a magnetic layer 10 having data tracks 14 is formed on this reflecting film. If the thickness of the magnetic layer 10 is relatively large as is the case with the conventional construction, the improvement of the light reflectance by the provision of the reflecting film under the magnetic layer 10 can not be recognized; however, if the thickness of the magnetic layer 10 is small as in the present invention, the improvement of the light reflectance by the provision of the reflecting film is recognized.

Examples of specific means for decreasing the light reflectance of the tracking recess 23 include the following means, and these can be suitably used either alone or in combination:

(1) The thickness of the tracking recess portion is limited to a specified range so that a low reflectance can be obtained;

(2) Convex and concave portions are formed on the bottom surface of the tracking recess so as to cause an irregular reflection;

(3) In the case where the tracking recess is constituted by a number of groups of pits, the ratio of a total area of the group of pits per unit area of the tracking recess is limited;

(4) In the case where the tracking recess is constituted by a number of groups of pits, the length of the longer axis and shorter axis of each pit are limited.

Light emitted from the light-emitting element 31 (comprising an infrared light-emitting diode) had a central wavelength of 880 nm, and the incident angle of this light was 20 degrees, and in this case the reflectance of the bottom portion of the tracking recess 23 was measured while varying the thickness of this bottom portion which lies between the bottom surface of the tracking recess 23 and the inner surface of the magnetic layer 10 facing away from the tracking recess 23. Results thereof are shown in Table 6 below.

TABLE 6

| Thickness of bottom portion of tracking recess (μm) | Reflectance (%) |
|---|---|
| 0.05 | 13.0 |
| 0.15 | 7.0 |
| 0.16 | 4.0 |
| 0.28 | 5.0 |
| 0.32 | 7.0 |
| 0.33 | 11.0 |
| 0.38 | 11.0 |
| 0.39 | 7.6 |
| 0.40 | 5.3 |
| 0.44 | 4.0 |
| 0.52 | 7.8 |
| 0.53 | 11.0 |
| 0.57 | 11.0 |
| 0.62 | 8.0 |
| 0.63 | 6.0 |
| 0.70 | 5.1 |
| 0.74 | 7.8 |
| 0.76 | 11.0 |
| 0.84 | 11.0 |

As is clear from this Table 6, the reflectance greatly varies depending on the thickness of the bottom portion of the tracking recess 23, and if the thickness of the bottom portion of the tracking recess 23 is not more than 0.05 μm, 0.33~0.38 μm, 0.53~0.57 μm, and 0.76~0.84 μm, the reflectance is high despite of the recess. Although the reason why the reflectance is thus high is not clear, it is thought that the reflecting property of the base film 9 disposed beneath the tracking recess 23 exerts an influence.

On the other hand, if the thickness of the bottom portion of the tracking recess 23 is limited to any one of the range of 0.15 to 0.32 μm, the range of 0.39 to 0.52 μm, the range of 0.62 to 0.74 μm, a lower reflectance (not more than 8%) can be obtained. Particularly, if the thickness of the bottom portion of the tracking recess 23 is limited to any one of the range of 0.16 to 0.28 μm, the range of 0.40 to 0.44 μm and the range of 0.63 to 0.73 μm, a lower reflectance can be obtained.

Incidentally, it has been confirmed through tests that even if the angle of incidence of the light to the magnetic layer 10 is varied, and even if the central wavelength of the light emitted from the light-emitting element 31 is changed to 830 nm, a low reflectance can be obtained in the same specified ranges as described above.

Next, the condition of the surface of the bottom portion of the tracking recess 23 will now be described. The tracking recesses 23 are formed, for example, by pressing as described above, and if the surface condition of the bottom portion of this recess is merely flat over the entire area thereof, light is regularly reflected by this flat bottom surface, and this is hardly related to the lowering of the reflectance.

Figure 13:
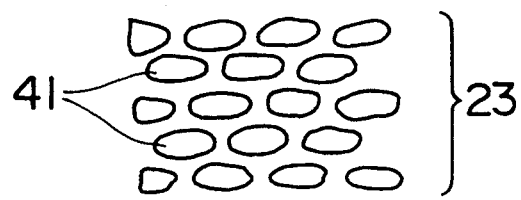
FIG. 13 is an enlarged plan view showing a tracking recess constituted by a group of pits.
Figure 14:
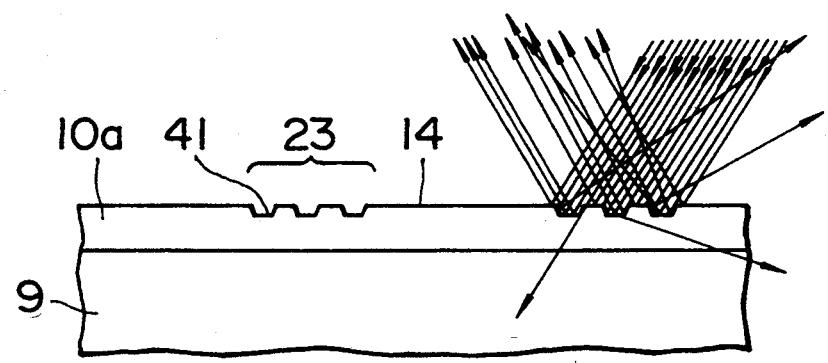
FIG. 14 is an enlarged cross-sectional view of a magnetic recording medium in which the bottom of each tracking recess is flat.

Therefore, applicants have earlier studied the case of constituting the tracking recess 23 by a number of groups of pits 41 of an oval shape, as shown in FIG. 13. FIG. 14 is an enlarged, cross-sectional view showing the tracking recesses 23 constituted by the group of pits 41. When the tracking recess 23 is thus formed by the group of pits 41, with the bottom surface of the tracking recess 23 (pits 41) being flat, it has been found that although part of incident light is irregularly reflected as shown at a left-side portion of FIG. 14, a sufficient irregular reflection effect can not be obtained.

Namely, since surfaces of projections at a distal end portion of a stamper for forming the pits 41 are flat, the flat surface condition of these projections is faithfully transferred to the magnetic layer 10, and it has been found that since the bottom surface of the pits 41 is flat as shown in FIG. 14, a sufficient irregular reflection effect can not be obtained.

Figure 15:
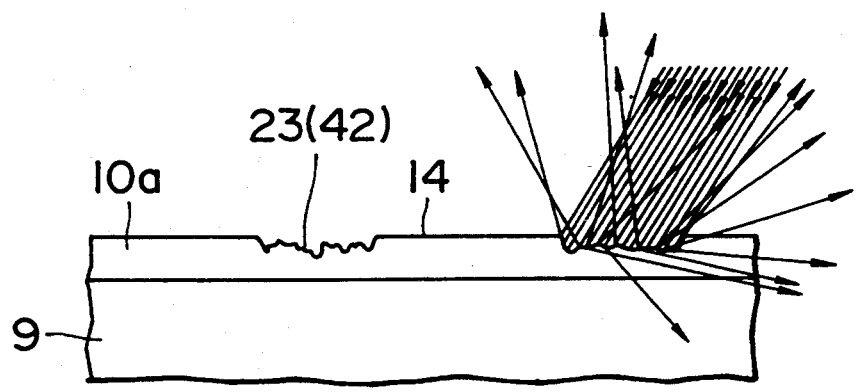
FIG. 15 is an enlarged cross-sectional view of a magnetic recording medium in which the bottom of each tracking recess is not flat.

Therefore, in the embodiment of the present invention, convex and concave portions 42 are formed on the bottom surface of the tracking recess 23 (the pits 41), thus eliminating the flat surface as shown in FIG. 15. By thus forming the convex and concave portions 42 on the bottom surface of the tracking recess 23 (the pits 41), almost all of incident light beams are irregularly reflected as shown at a right portion of FIG. 15.

Figure 16:
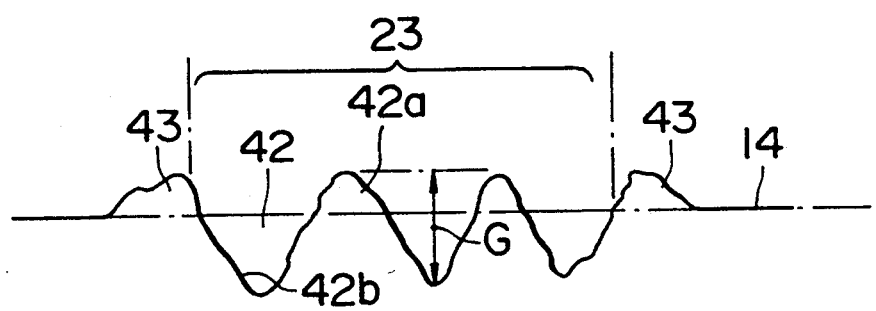
FIG. 16 is an enlarged cross-sectional view of a tracking recess.
Figure 17:
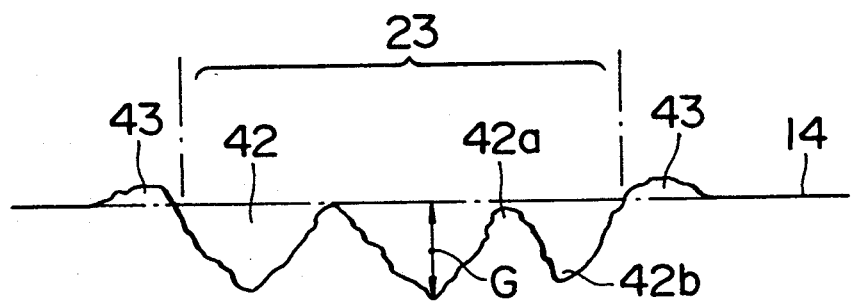
FIG. 17 is an enlarged cross-sectional view of a tracking recess.
Figure 18:
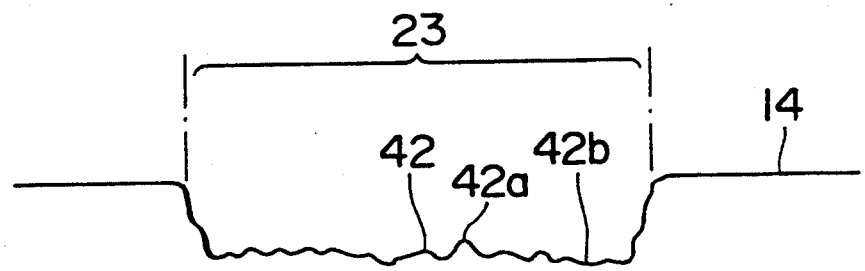
FIG. 18 is an enlarged cross-sectional view of a tracking recess.

FIGS. 16 to 18 are enlarged cross-sectional views showing specific examples of such convex and concave portions 42, respectively. A number of convex and concave portions 42 are formed on the bottom surface of the tracking recess 23 (the pits 41), and in the example of FIG. 16, distal ends of convex portions 42a of the convex and concave portions 42 are projected slightly beyond the surface of the data track 14. In this example, that portion of each data track 14 disposed adjacent to the tracking recess 23 is projected from the other surface of the data track 14 to form a protuberance 43 extending continuously or discontinuously along the length of the tracking recess 23 (that is, in a direction perpendicular to the sheet of FIG. 16).

In the example of FIG. 17, distal ends of convex portions 42a are disposed generally flush with or slightly lower than the surface of the data track 14. In FIG. 16 and FIG. 17, a difference G in level between the distal end of the convex portion 42a and the bottom of a concave portion 42b is limited to the range of 0.01 to 0.5 μm. If this level difference G is less than 0.01 μm, the effect of decreasing the reflectance is substantially insufficient. On the other hand, if this level difference G is more than 0.5 μm, the reduction of the output due to a spacing loss is encountered, and this is not desirable. Therefore, the level difference G is limited to the range of 0.01 to 0.5 μm.

In the example of FIG. 18, the fine convex and concave portions 42 are formed generally uniformly on the bottom surface of the tracking recess 23, and the above-mentioned protuberance 43 are not formed. The maximum surface roughness Rmax of the bottom surface of the tracking recess 23 is in the range of about 0.1 μm to about 1 μm. The reason why the above-mentioned protuberances 43 are not provided is to avoid the formation of a spacing loss between the magnetic recording medium and the magnetic head by such protuberances 43. Such convex and concave portions 42 are formed by applying a laser beam or an ion beam directly to that portion where the tracking recess 23 is to be formed, so that the intermolecular bond between organic compounds such as binder in the magnetic layer 10 is cut off and eliminated.

Also, such convex and concave portions can be formed by a method in which the surface of projections of a stamper (made of a steel material such as alloy tool steel, high carbon steel, high speed steel and spring steel) for forming the tracking recesses 23 is irregularly roughened, for example, by discharge processing, sandblasting, ion beam sputtering, laser beam processing or plasm etching, and this irregular surface is transferred to the magnetic layer 10 under a relatively low pressure. If a number of convex portions 42a, concave portions 42b and protuberances 43 having a mountain-shaped cross-sectional shape exist as shown in FIGS. 16 to 18, the light beams applied from the light-emitting element 31 to the surfaces of these portions can be irregularly reflected randomly in various directions.

In the embodiment of the present invention, a number of pits 41 are arranged or juxtaposed in rows, and the tracking recess 23 is constituted by a group of pits 41. The ratio of a total area of the group of pits 41 per unit area of the tracking recess 23 will now be described.

Figure 19:
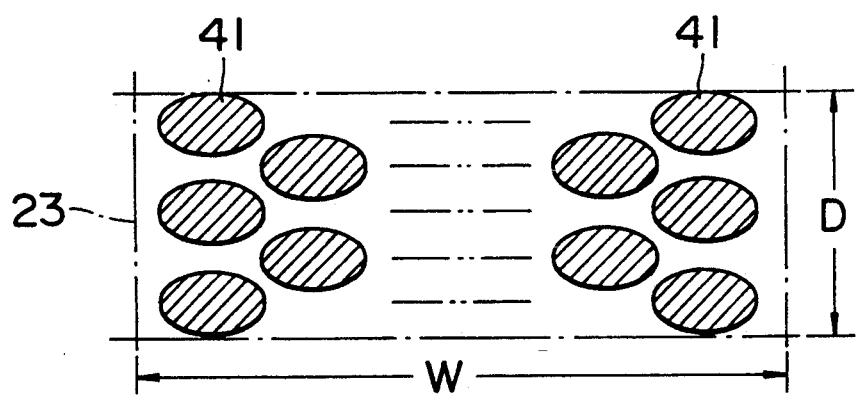
FIG. 19 is an enlarged plan view of a tracking recess constituted by a group of pits.

As shown in FIG. 19, the tracking recess 23 is formed by arranging pits 41, for example, of an oval shape in rows, and here the unit area (W×D) of the tracking recess is represented by St, and the total area of the group of pits 41 is represented by Sp. In this case, the ratio (Sp/St) of the total area St of the group of pits 41 per unit area St of the tracking recess 23 has been studied, and as a result (Sp/St)≧0.25 is preferred, and not less than 0.30 is more preferred. If this ratio (Sp/St) is less than 0.25, the flat surface portions of the tracking recess 23 where the pits 41 are not formed exert an influence, so that the reflectance of the tracking recess is increased. This is not desirable, and therefore the ratio (Sp/St) should be limited to not less than 0.25.

Figure 20:
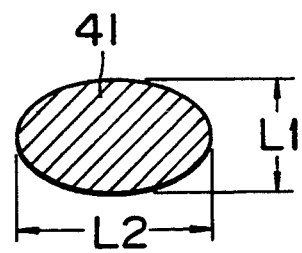
FIG. 20 is an enlarged plan view of a pit.

In the case where the tracking recess 23 is constituted by the group of pits 41 of an oval shape as described above, it is preferred that the length L1 of the shorter axis of each pit 41 be not more than 0.7 μm, and that the length L2 of the longer axis thereof be not more than 1.3 μm, as shown in FIG. 20. If the length L1 of the shorter axis of the pit 41 is more than 0.7 μm, projections 43 in the tracking recess 23 are larger, and similarly to the length of shorter (minor) axis, if the length L2 of the longer (major) axis of the pit 41 is more than 1.3 μm, the projections 43 are larger. As a result, adverse effects such as the reduction of the output are encountered, and therefore it is preferred that L1 and L2 should be limited as described above. In this embodiment, although the pits 41 arranged in rows have an oval shape in a plan view, the shape of the pit is not limited to this, and can be of any other suitable shape such, for example, as a circular shape, a triangular shape and a square shape.

Figure 21:
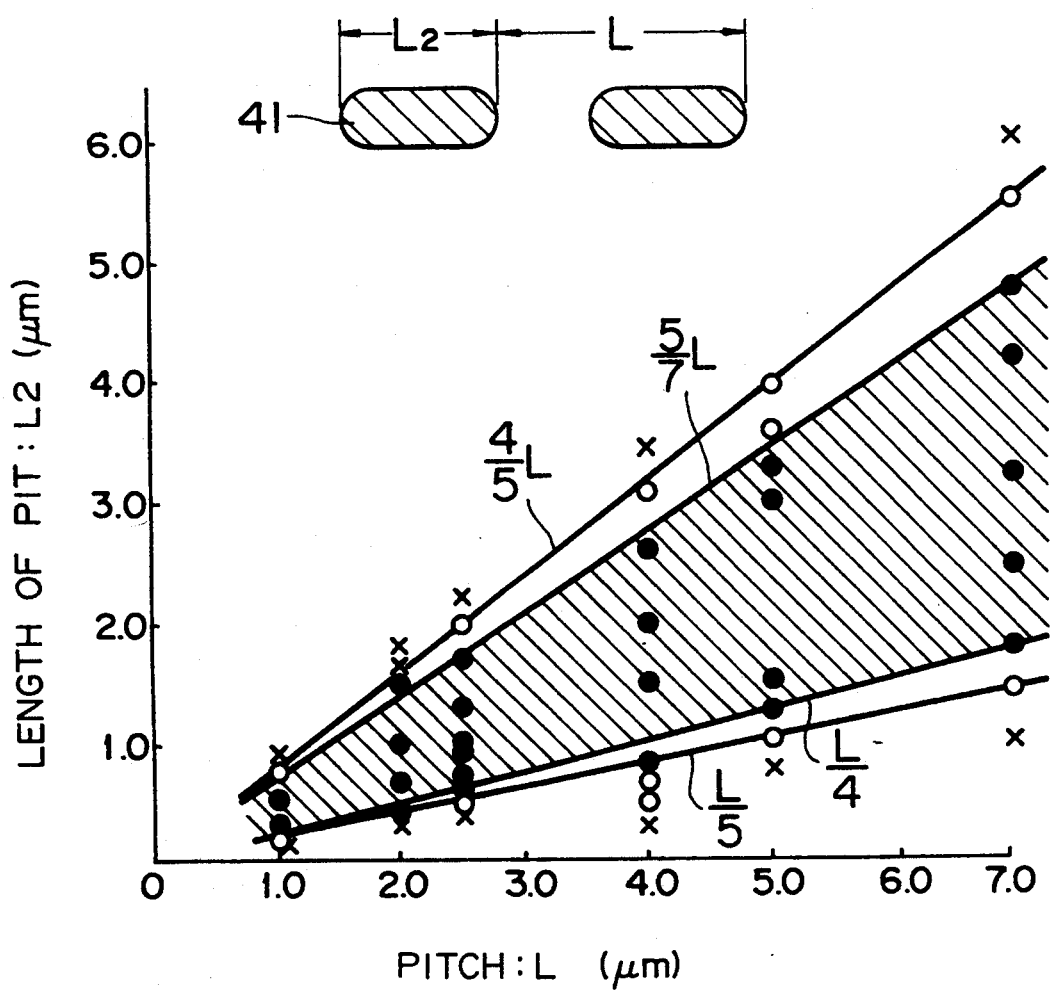
FIG. 21 is a diagram showing the performance of the pits in terms of the relation between a length L2 of a longer axis of the pit and a pitch L of the pits.
Figure 22:
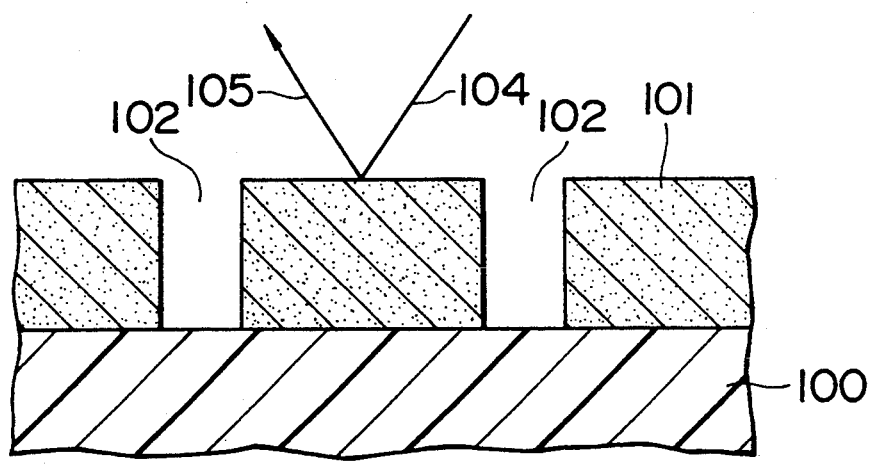
FIG. 22 is an enlarged cross-sectional view of a conventional magnetic recording medium.
Figure 23:
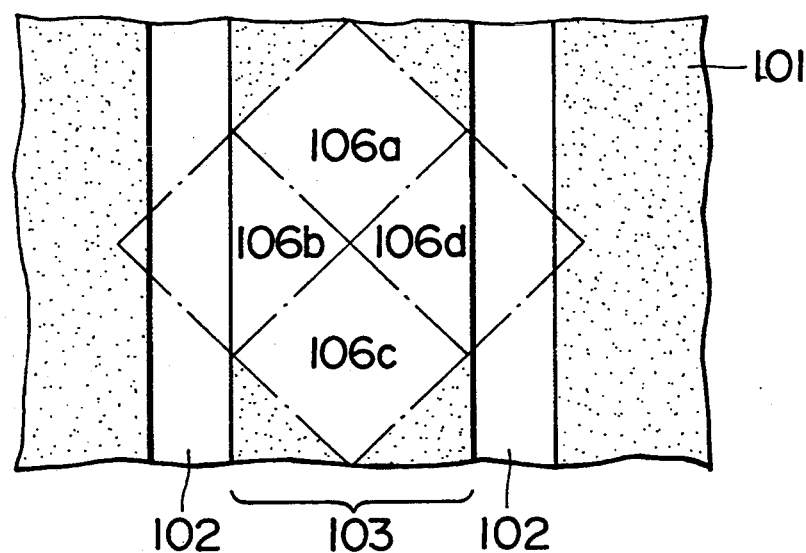
FIG. 23 is a view explanatory of the condition of arrangement of light-receiving elements over the conventional magnetic recording medium.

The length L2 of the longer axis of the pit 41, the pitch L of the pits 41, the performance of the magnetic disk and the lifetime of the stamper have been studied, and results thereof are shown in FIG. 21. In this Figure, represents a point where the servo signal exceeds 5.0 V. ○ represents a point where the servo signal is 4.4~5.0 V. X represents a point where the servo signal is less than 4.4 V. At the portions of X, S/N is lowered, and a problem with reliability arises.

Namely, the relation between the length L2 of the longer axis of the pit 41 and the pitch L of the pits 41 has been extensively studied, and as a result the following points have become clear:

(1) If the relation between the length L2 of the longer axis of the pit 41 and the pitch L of the pits 41 is such that L2>(4/5)L is established, that portion of the magnetic layer between any adjacent two pits in the stamped magnetic disk is markedly raised to cause a spacing loss, so that the electrical output and the overwrite effect are lowered;

(2) If the relation between the length L2 of the longer axis of the pit 41 and the pitch L of the pits 41 is such that L2<L/5 is established, a sufficient servo output can not be obtained;

(3) If the pitch L is less than 1.0 μm (that is, L<1.0 μm), magnetic powder, a filler, a binder and etc., can easily bit in between the pits in the stamper at the time of the stamping operation, and this shortens the lifetime of the stamper; and (4) If the pitch L is more than 7.0 μm (that is, L>7.0 μm), the pressure of the stamper exerted per pit is small, and therefore the pit 41 can not be formed faithfully even if L/5≦L2≦(4/5)L is satisfied.

Therefore, the relation between L2 and L should be determined such that 1.0 μm≦L≦7.0 μm and L/5≦L2≦(4/5)L are satisfied, and more preferably the following relation should be established:

$$1.0 \mu m \leq L \leq 5.0 \mu m \text{ and } L/4 \leq L2 \leq (5/7)L$$

With the above construction of the present invention, variations in light reflectance are small, and therefore there can be provided the magnetic recording medium in which a stable servo signal can be obtained, and the tracking servo of the magnetic head by the tracking optical recesses can be properly effected.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising
a substrate of a non-magnetic material,
a magnetic layer formed on said substrate, wherein a number of magnetic head-tracking recesses are formed in a surface of said magnetic layer at predetermined intervals; and
a data track for recording desired information provided between any two adjacent magnetic head-tracking recesses, such that when light is applied to said magnetic head-tracking recesses and said data tracks, tracking of a magnetic head is effected in accordance with light reflected by said tracking recesses and said data tracks and a relation Z≦0.49 is established when light reflectance on said data track is represented by X, light reflectance of said magnetic head-tracking recess is represented by Y, and Z=Y/X.

2. A magnetic recording medium according to claim 1, in which light reflectance X on said data track is not less than 5%.

3. A magnetic recording medium according to claim 1, in which thickness of those portions of said magnetic layer at which said data tracks are formed, respectively, is limited to any one of the ranges of 0.28 to 0.40 μm, and 0.51 to 0.63 μm, as measured by a transmission-type electron microscope.

4. A magnetic recording medium according to any one of claims 1 to 3, in which surface roughness of those portions of said magnetic layer at which said data tracks are formed, respectively, is not more than 0.015 μm.

5. A magnetic recording medium according to claim 4, in which a light reflecting film is formed under those portions of said magnetic layer at which said data tracks are formed, respectively.

6. A magnetic recording medium according to any one of claims 1 to 3, in which a light reflecting film is formed under those portions of said magnetic layer at which said data tracks are formed, respectively.

7. A magnetic recording medium according to claim 1 or 3, in which the thickness of a bottom portion of said magnetic head-tracking recess is limited to any one of the range of 0.15 to 0.32 μm, the range of 0.39 to 0.52 μm and the range of 0.62 to 0.74 μm.

8. A magnetic recording medium according to claim 7, in which convex and concave portions are formed on a surface of the bottom portion of said magnetic head-tracking recess, thus eliminating a flat portion from said bottom surface.

9. A magnetic recording medium according to claim 8, in which distal ends of convex portions formed on the surface of the bottom portion of said magnetic head-tracking recess are projected beyond a flat surface of said data track.

10. A magnetic recording medium according to claim 9, in which the difference in level between a distal end of each of convex portions, formed on the surface of the bottom portion of said magnetic head-tracking recess, and a bottom of each of concave portions formed on the surface of the bottom portion of said magnetic head-tracking recess is limited to the range of 0.01 to 0.5 μm.

11. A magnetic recording medium according to claim 8, in which that portion of said data track disposed adjacent to said magnetic head-tracking recess is projected from the other surface of said data track.

12. A magnetic recording medium according to claim 11, in which the difference in level between a distal end of each of convex portions, formed on the surface of the bottom portion of said magnetic head-tracking recess, and a bottom of each of concave portions formed on the surface of the bottom portion of said magnetic head-tracking recess is limited to the range of 0.01 to 0.5 μm.

13. A magnetic recording medium according to claim 8, in which the difference in level between a distal end of each of convex portions, formed on the surface of the bottom portion of said magnetic head-tracking recess, and a bottom of each of concave portions formed on the surface of the bottom portion of said magnetic head-tracking recess is limited to the range of 0.01 to 0.5 μm.

14. A magnetic recording medium according to claim 8, in which said magnetic head-tracking recess is formed by a number of groups of pits; and when a unit area of said tracking recess is represented by St, and a total area of the group of pits within said unit area is represented by Sp, the ratio (Sp/St) of the total area Sp of the group of pits per unit area St of said tracking recess is limited to not less than 0.25.

15. A magnetic recording medium according to claim 8, in which said magnetic head-tracking recess is formed by a number of groups of pits, and a shorter axis of each of said pits is limited to not more than 0.7 μm, and a longer axis of said pit is limited to not more than 1.3 μm.

16. A magnetic recording medium according to claim 1, in which convex and concave portion are formed on a surface of a bottom portionof each of said magnetic head-tracking recesses, thus eliminating a flat portion from said bottom surface.

17. A magnetic recording medium according to claim 16, in which each of said magnetic head-tracking recesses is formed by a number of groups of pits and when a unit area of said tracking recess is represented by St, and a total area of the group of pits within said unit area is represented by Sp, the ratio (Sp/St) of the total area Sp of the group of pits per unit area St of said tracking recess is limited to not less than 0.25.

18. A magnetic recording medium according to claim 16, in which each of said magnetic head-tracking recesses is formed by a number of groups of pits, and a shorter axis of each of said pits is limited to not more than 0.7 μm, and a longer axis of each of said pits is limited to not more than 1.3 μm.

19. A magnetic recording medium according to claim 16, in which the difference in level between a distal end of each of convex portions, formed on the surface of the bottom portion of said magnetic head-tracking recess, and a bottom of each of concave portions formed on the surface of the bottom portion of said magnetic head-tracking recess is limited to the range of 0.01 to 0.5 μm.

20. A magnetic recording medium according to claim 16, in which distal ends of convex portions formed on said surface of said bottom portion of said magnetic head-tracking recess are projected beyond a flat surface of said data track.

21. A magnetic recording medium according to claim 20, in which that portion of said data track disposed adjacent to said magnetic head-tracking recess is projected from another surface of said data track.

22. A magnetic recording medium according to claim 21, in which the difference in level between a distal end of each of convex portions, formed on the surface of the bottom portion of said magnetic head-tracking recess, and a bottom of each of concave portions formed on the surface of the bottom portion of said magnetic head-tracking recess is limited to the range of 0.01 to 0.5 μm.

23. A magnetic recording medium according to claim 20, in which the difference in level between a distal end of each of convex portions, formed on the surface of the bottom portion of said magnetic head-tracking recess, and a bottom of each of concave portions formed on the surface of the bottom portion of said magnetic head-tracking recess is limited to the range of 0.01 to 0.5 μm.

24. A magnetic recording medium according to claim 1, in which each of said magnetic head-tracking recesses is formed by a number of groups of pits, and when a longer axis of each of said pits is represented by L2, and the pitch of said pits is represented by L, the following relation is established:

$$0 \ \mu m \leq L \leq 7.0 \ \mu m \text{ and } L/5 \leq L2 \leq (4/5)L.$$

25. A magnetic recording medium according to claim 1, in which each of said magnetic head-tracking recesses is formed by a number of groups of pits, and when a longer axis of each of said pits is represented by L, the following relation is established:

$$1.0 \ \mu m \leq L \leq 5.0 \ \mu m \text{ and } L/4 \leq L2 \leq (5/7)L.$$

* * * * *